Jan. 9, 1934. B. NOYES, JR 1,942,516
THERMOMETER FOR MEASURING TEMPERATURE OF THE SKIN
Filed May 14, 1930
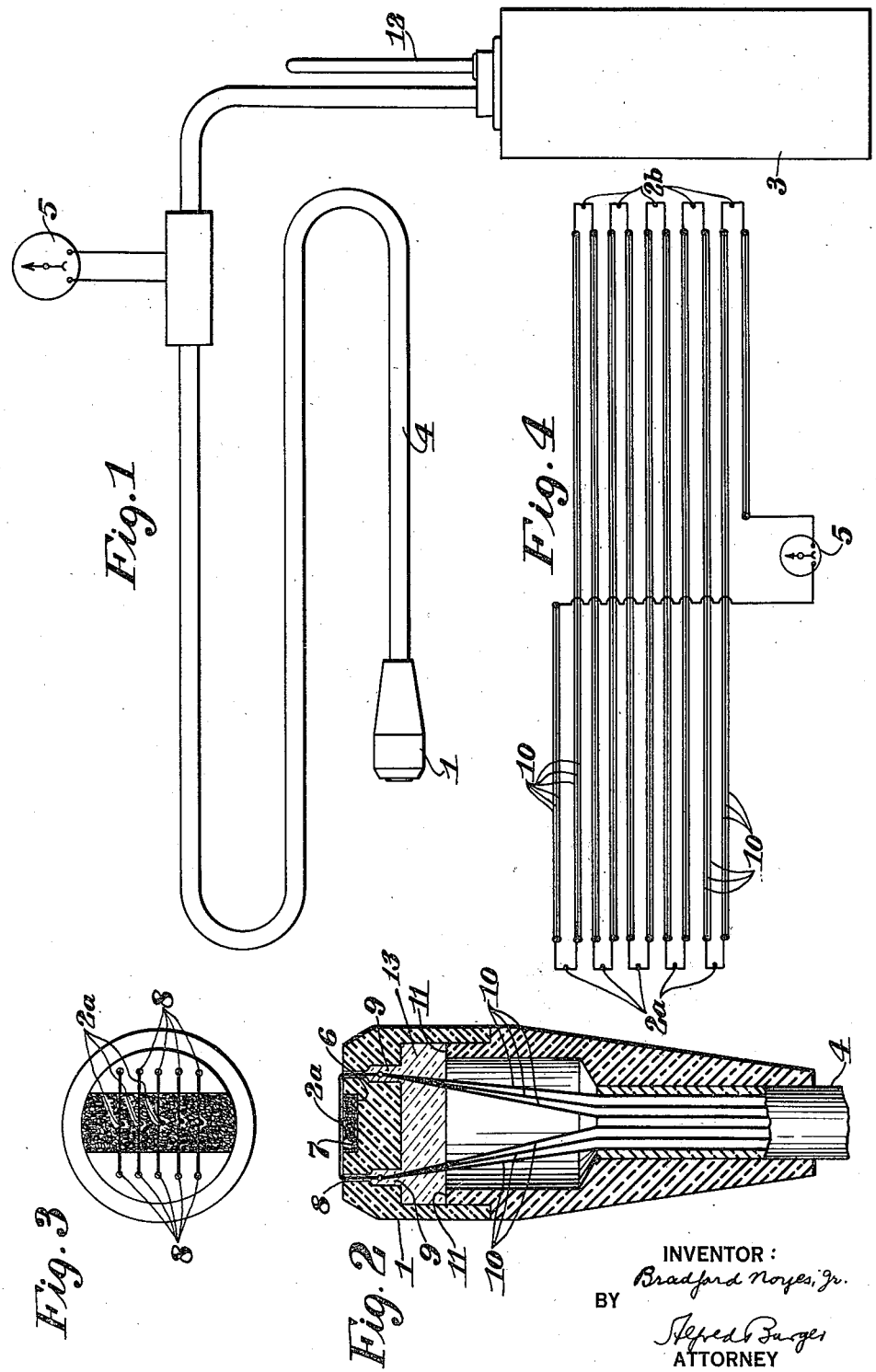

UNITED STATES PATENT OFFICE 1,942,516

THERMOMETER FOR MEASURING TEMPERATURE OF THE SKIN

Bradford Noyes, Jr., Rochester, N. Y., assignor to Taylor Instrument Companies, Rochester, N. Y., a corporation of New York Application May 14, 1930. Serial No. 452,262

3 Claims. (Cl. 136—4)

This invention relates to instruments for measuring the temperature of the skin.

It is the specific object of the invention to provide an instrument of the character referred to, which indicates the true temperature of the skin and which indicates it immediately.

For a full understanding of the invention, the principle on which it is based and its advantages, reference is made to the accompanying drawing, wherein Fig. 1 is a diagrammatic representation of an instrument embodying the invention;

Fig. 2 is a sectional view on an enlarged scale of a detail forming the principal part of the invention;

Fig. 3 is a face view of the arrangement shown in Fig. 2; and

Fig. 4 is a diagrammatic view of the electric connections involved.

Having reference to Fig. 1, 1 is the contact member, i. e. that part of the instrument which is placed in contact with the skin. It contains the hot junctions 2a of a plurality of thermo-couples, the cold junctions 2b of which are contained in a Dewar flask 3 a suitable distance from the hot junctions, the intervening parts of the thermo-couples being sheathed by a rubber hose or other flexible tube 4. As seen in Fig. 4, the thermo-couples are connected in series and the free ends are connected to a galvanometer 5. Through the stopper of the flask 3 extends a thermometer 12, the bulb being in the flask and the graduations extending upwardly from the stopper so as to be easily read.

No novelty is claimed for the construction thus far described.

To carry out the object of the invention, the thermo-couples proper are made of exceedingly fine wire, preferably not in excess of #34. The contact member 1 which is of solid heat-insulating material, preferably a phenolic condensation product, has in its contact surface a depression 6 filled with a piece of felt 7 on which the hot junctions and the adjacent parts of the thermo-couples lie in parallelism, the hot junctions preferably disposed midway between the sides of the felt. From the hot junctions the wires extend in opposite directions over the felt and then pass through fine openings 8 rearwardly into larger bores 9, where they are joined each to a plurality of wires 10, which are coated with enamel or other insulating material.

When the thermo-couples are pulled taut, the bores 9 and a part of the hollow space below them are filled with paraffin or other suitable insulating material 13, which is held in fixed position by shoulders 11. Upon cooling and solidifying of the paraffin, the latter maintains all thermo-couples in a definite position and alignment.

The plurality of wires 10 have the object to reduce the electrical resistance without materially changing the flexibility of the tubing 4.

The practical significance of the arrangement is as follows: The wires forming the hot junctions are so fine that they do not appreciably lower the temperature at the contact surface. The felt below the hot junction and the adjoining wire sections prevents transfer of heat away from the hot junction. The only propagation of heat away from the hot junction is through the wires themselves. However, since the wires so far as they are in contact with the felt, i. e. a substantial distance from the hot junction have substantially the same temperature as the latter, there is no substantial temperature gradient along the wires between the hot junctions and the solid parts of the contact member. From the points where the wires rest on the solid parts of the contact member there is a heat transfer away from the skin, but this transfer is comparatively small since phenolic condensation material or the like is a good heat insulator although not as good as the felt. The hot junctions are heated up to the skin temperature within a few seconds and there is no heat leakage that could cause an appreciable temperature depression below the true temperature of the skin, with the result that the true temperature of the skin can be determined immediately.

The hot junctions due to the solid anchorage in a block of paraffin or the like are maintained in a fixed position. The holes 8 are just large enough to accommodate the wires and thus prevent lateral motion which might otherwise be induced by contact with the skin. Thus the fine wires are not subject to any wear such as might cause a breakage.

The Dewar flask maintains a uniform temperature during the test. The temperature is determined by reading the galvanometer, which indicates the temperature of the skin above the temperature of the Dewar flask and then adding this reading to the reading of the thermometer reading. While the temperature of the flask may gradually change, such change is of no consequence since it remains uniform during the test which lasts only a few seconds.

I claim:

1. In an instrument for measuring the temperature of the skin, the combination of a contact member of heat-insulating material, having a flat contact surface and a depression in said contact surface, a block of felt filling the depression, a plurality of thermo-couples having their hot junctions disposed in central alignment upon the felt, the contact member being provided with fine bores on opposite sides of the block of felt and with larger bores inwardly of the fine bores and with a space extending across all said larger bores at the inner ends thereof, said space being inwardly limited by shoulders, the wires of the thermo-couples extending through said fine bores into the larger bores and through said space, and a solid piece of insulating material filling said larger bores and said space.

2. An instrument according to claim 1, wherein the thermo-couple conductors between the hot junctions and the said larger bores are exceedingly fine wire and have an increased effective cross-section beyond the said larger bores.

3. An instrument according to claim 1, wherein the thermo-couple conductors between the hot junctions and the said larger bores are exceedingly fine wire and comprise each a plurality of wires beyond the said larger bores.

BRADFORD NOYES, Jr.